United States Patent
Ishiguro et al.

(10) Patent No.: US 8,066,180 B2
(45) Date of Patent: Nov. 29, 2011

(54) CARD PROCESSOR

(75) Inventors: Jun Ishiguro, Nagakute (JP); Akihiro Tadamasa, Seto (JP); Masahiro Yoshii, Nagakute (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 827 days.

(21) Appl. No.: 11/607,088

(22) Filed: Dec. 1, 2006

(65) Prior Publication Data

US 2007/0162187 A1    Jul. 12, 2007

(30) Foreign Application Priority Data

Dec. 26, 2005 (JP) ................. 2005-371645

(51) Int. Cl.
G06Q 40/00 (2006.01)
G07D 11/00 (2006.01)
G07F 19/00 (2006.01)

(52) U.S. Cl. .... 235/379; 235/380; 235/449; 235/472.01

(58) Field of Classification Search .......... 235/439, 235/440, 449, 475, 476
See application file for complete search history.

(56) References Cited

U.S. PATENT DOCUMENTS

| | | | |
|---|---|---|---|
| 3,833,885 A | 9/1974 | Gentile et al. | |
| 4,007,356 A | 2/1977 | Stucke et al. | |
| 4,567,358 A * | 1/1986 | Takamatsu et al. | 235/379 |
| 4,803,347 A * | 2/1989 | Sugahara et al. | 235/379 |
| 6,865,592 B1 * | 3/2005 | Shindo | 709/203 |

FOREIGN PATENT DOCUMENTS

| | | |
|---|---|---|
| EP | 0 348 959 A2 | 1/1990 |
| EP | 1 519 297 A2 | 3/2005 |
| JP | 62-222362 | 9/1987 |
| JP | 3-113407 | 12/1991 |
| JP | 05-089295 | 4/1993 |
| JP | 05-166035 | 7/1993 |
| JP | 7-334588 A | 12/1995 |
| JP | 08-255409 | 10/1996 |
| JP | 2526916 Y2 | 11/1996 |
| JP | 09-305731 | 11/1997 |
| JP | 3175956 B2 | 4/2001 |
| WO | WO 96/21194 | 7/1996 |

OTHER PUBLICATIONS

European Search Report issued in European Patent Application No. EP 06 02 4828, dated Apr. 2, 2007.
Japanese Office Action, with English translation, issued in Japanese Patent Application No. 2005-371645, mailed Feb. 1, 2011.

* cited by examiner

Primary Examiner — Steve S Paik
Assistant Examiner — Christopher Stanford
(74) Attorney, Agent, or Firm — McDermott Will & Emery LLP

(57) ABSTRACT

From the detection result of a sensor for detecting a card, whether or not the card exists in the inside, and whether or not the card exists in a return area are determined, respectively, and in the state where it is determined that the card exists in the inside, if the time counted by a first timer has reached a time while a command from a host system is not received by a communication unit, then it carries out the communication error process of addressing that the command is not received. That is, the card in the inside is returned to the area, and subsequently, in the state that it is determined that the returned card exists in the area, if the time counted by a second timer reaches a second time while the card is not taken out from the area, the card is taken to the inside.

2 Claims, 12 Drawing Sheets

FIG. 1

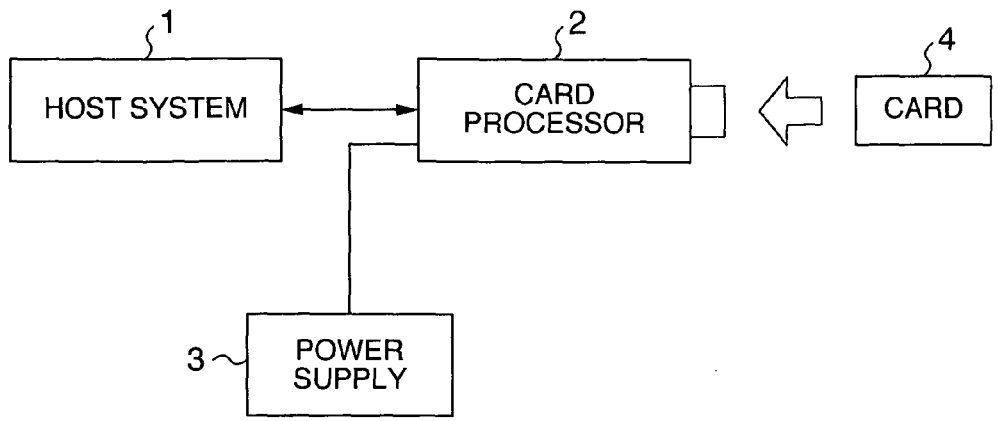

FIG. 4

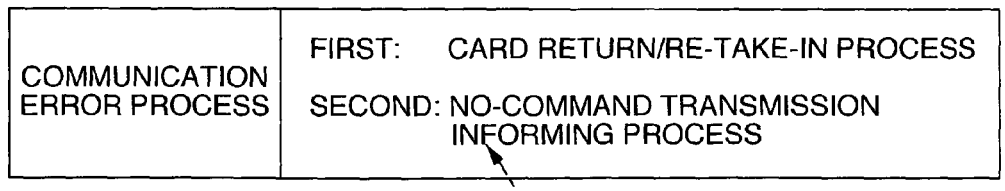

| COMMUNICATION ERROR PROCESS | FIRST: CARD RETURN/RE-TAKE-IN PROCESS<br>SECOND: NO-COMMAND TRANSMISSION INFORMING PROCESS |

SETTING CANDIDATES
• CARD RETURN/RE-TAKE-IN PROCESS
• HARDWARE RESET PROCESS
• CARD PROCESSING RE-EXECUTION INHIBIT PROCESS
• NO-COMMAND TRANSMISSION INFORMING PROCESS
• COMMAND STANDBY PROCESS
• TRANSACTION NOT READY INFORMING PROCESS

BEFORE INSERTING A CARD

DURING TAKING IN A CARD

DURING RETURNING A CARD

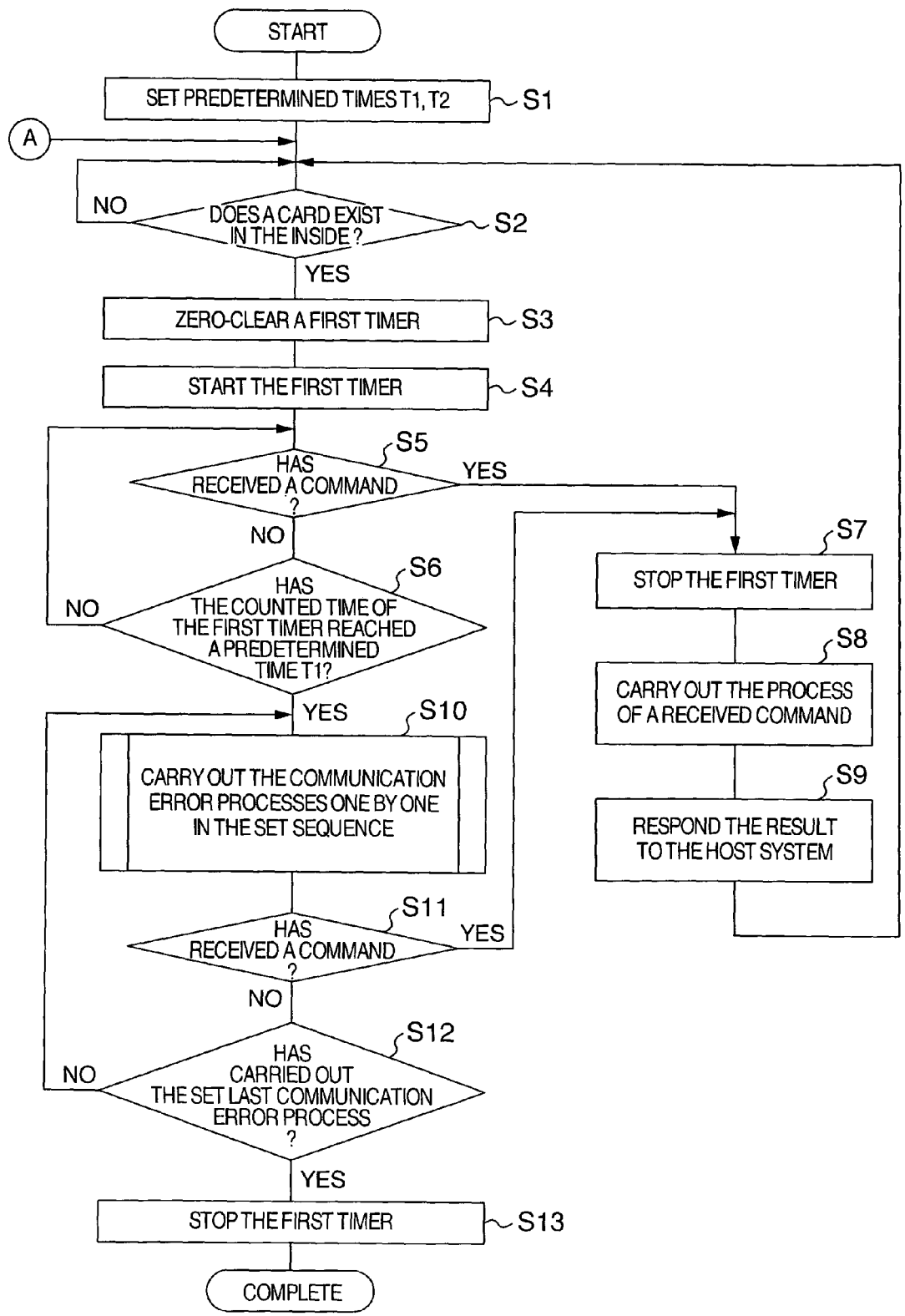

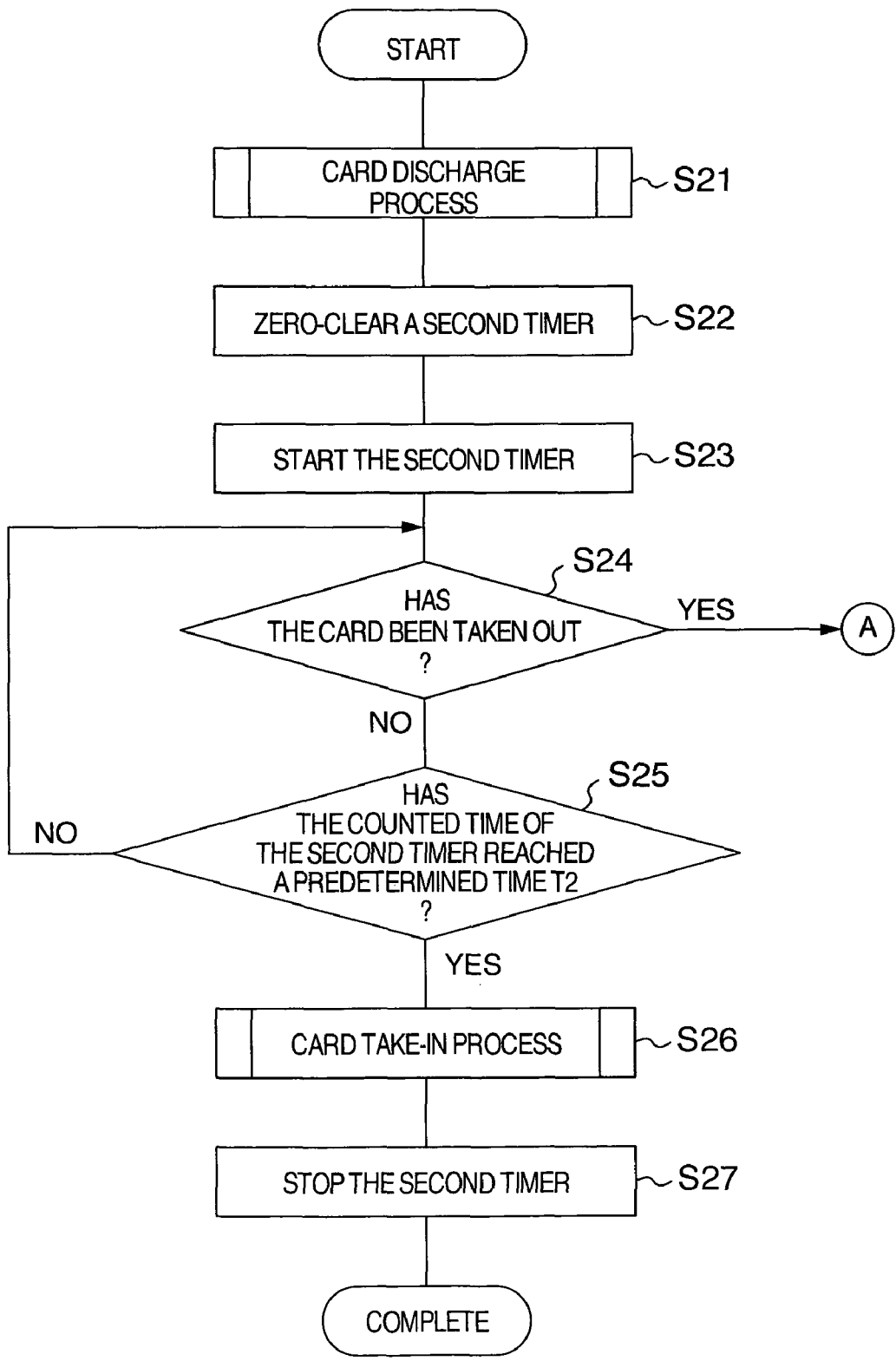

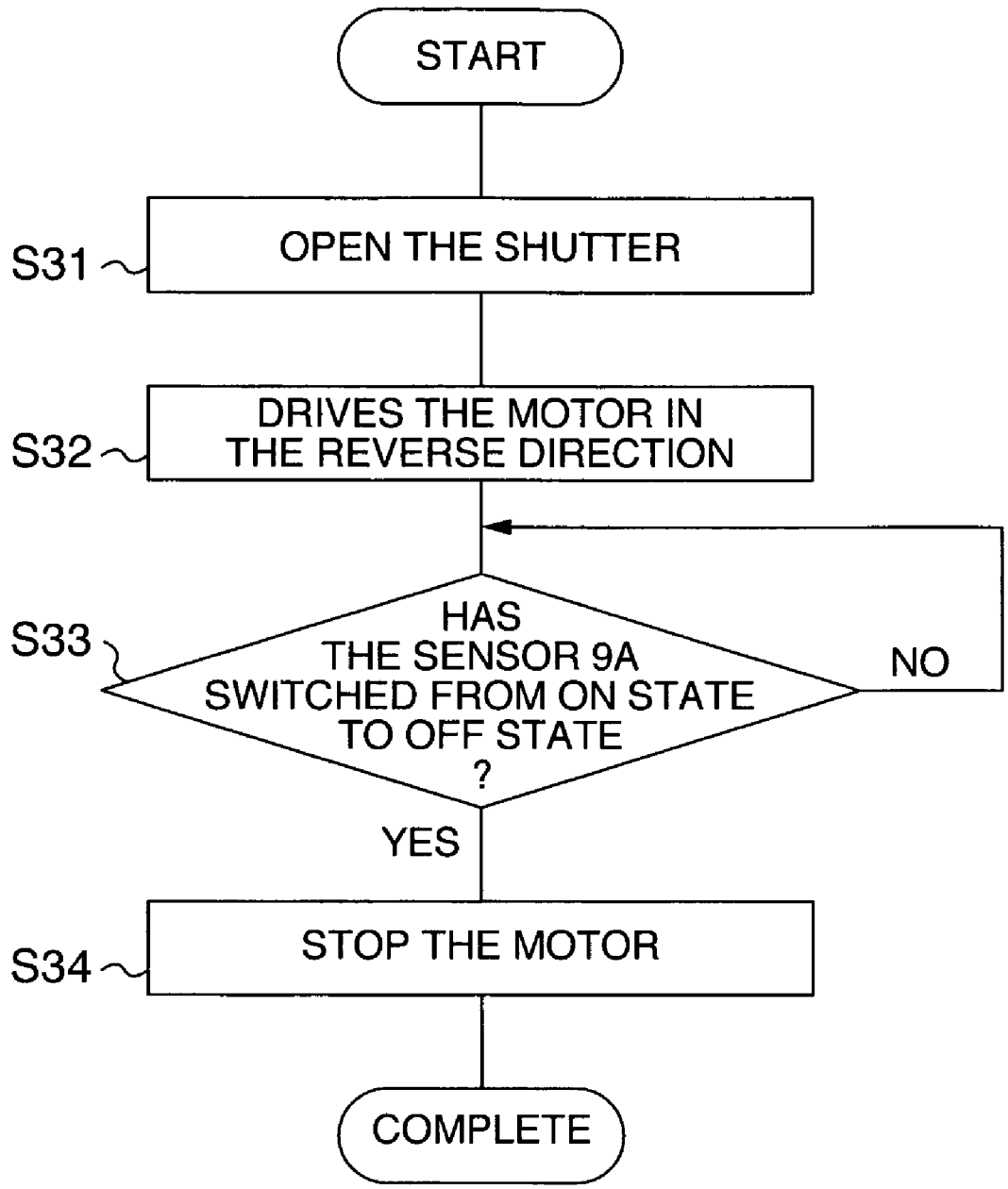

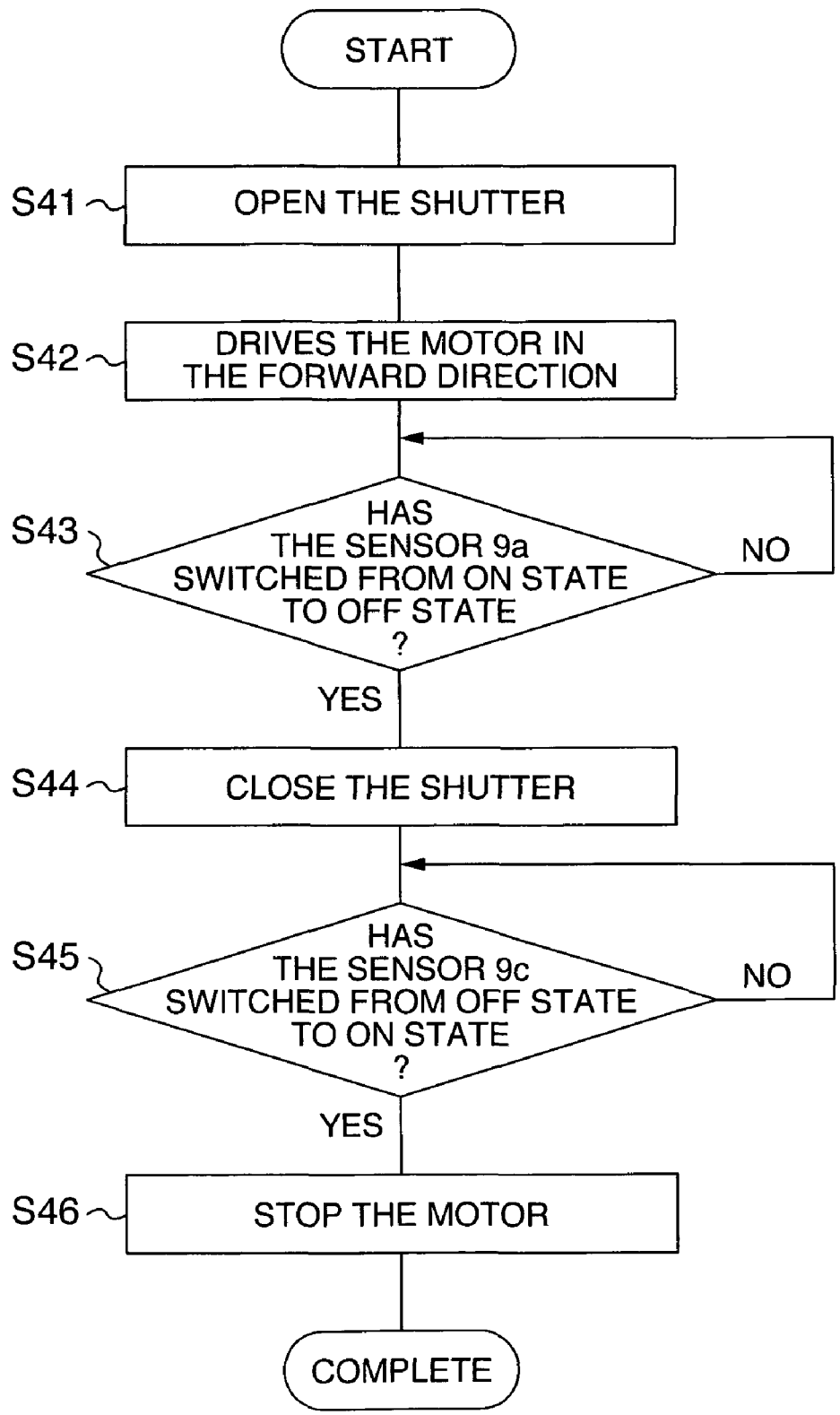

HARDWARE RESET PROCESS

CARD PROCESSING RE-EXECUTION INHIBIT PROCESS

NO-COMMAND TRANSMISSION INFORMING PROCESS

COMMAND RECEPTION STANDBY PROCESS

TRANSACTION NOT READY INFORMING PROCESS

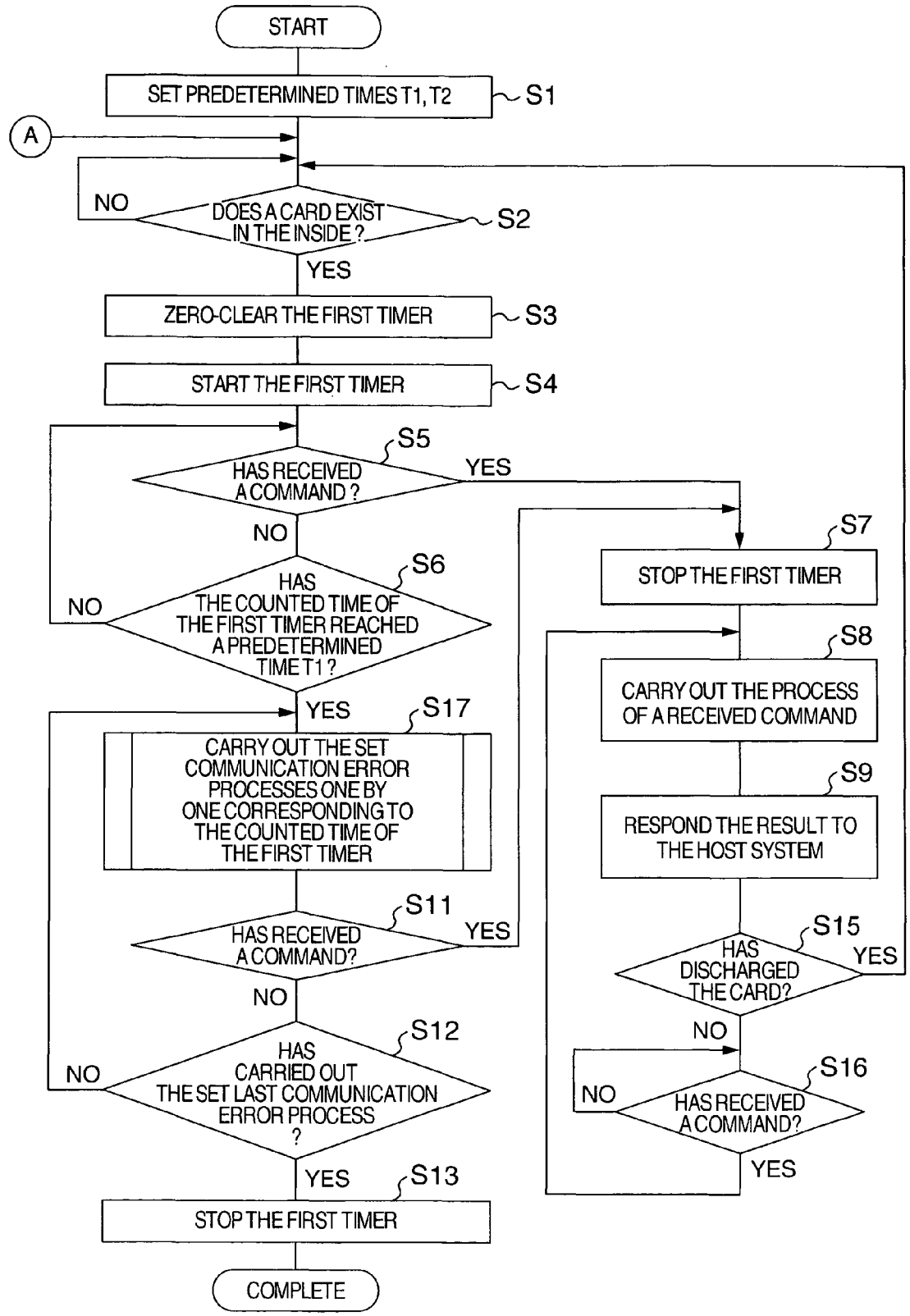

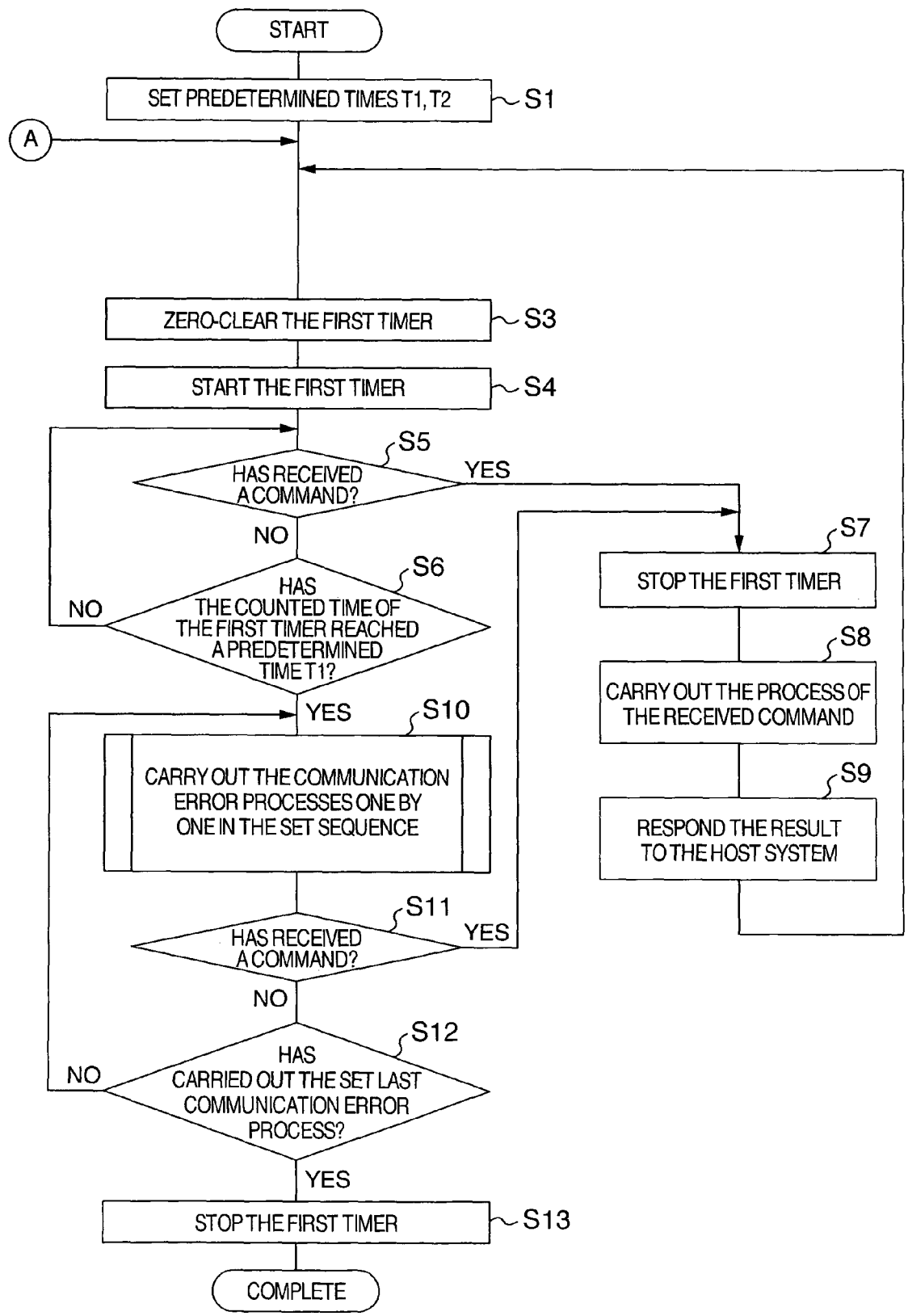

CARD PROCESSOR

INCORPORATION BY REFERENCE

This application claims the benefit of priority of Japanese Application No. 2005-371645 filed Dec. 26, 2005, and the disclosure of which also is entirely incorporated herein by reference.

BACKGROUND OF THE INVENTION

1. Field of the Invention

The present invention relates to a card processor receiving a card and carrying out predetermined processes.

2. Description of the Related Art

Card processors mounted on cash automatic teller machines (hereinafter, referred to as "ATM"), or the like, of a bank include the one, which is connected to a host system, such as ATM, through a predetermined interface, and carries out predetermined processes concerning a card in response to instructions from the host system, and discharges the card to the outside upon completion of the predetermined processes. In case of such a card processor, a user inserts a card to a relevant card processor in accordance with the guidance which a host system displays on a display unit, and the user will stands by in front of the host system until the predetermined processes are completed and the card is returned from the card processor.

Moreover, card processors connected to a host system and carrying out processes in response to instructions from the host system include the one, which discharges a card existing in the inside to the outside and returns in case that abnormalities occurred in the communication line to the host system and there is no communication from the host system for a certain period of time, or in case that the host system ran away for some reasons and there is no processing instruction with respect to the card for a certain period of time, the processing instruction being based on instructions from the host system (see, for example, Japanese Utility Model No. 2526916 and Japanese Patent No. 3175956).

On the other hand, host systems connected to a card processor and sending instructions to the card processor include the one, which instructs the card processor to take a card to the inside if the card is still held at the return area in a certain period of time after instructing the card processor to return the card to the return area, (see JP-A-7-334588).

SUMMARY OF THE INVENTION

If problems, such as that the communication line between a host system, such as ATM, and a card processor results in service interruption due to disconnection, noises, or the like, or that a host system or a card processor, for some reasons, results in no response (a state of hang-up, freezing, or the like) or in runaway (a state where a program is carried out abnormally, resulting in out-of-control or in a conflicting state between the host system and card processor), occurred, the host system and card processor become inoperable even if a user carries out some operations, because no instructions will be transmitted to the card processor from the host system. For example, if the above problems occurred while the host system is displaying on a display unit a screen prompting the user to insert a card, the card processor will not take the card to the inside even if the user inserted the card to the inside of the card processor, because the card processor does not receive from the host system an instruction to take in the card. At this time, the user may insert a card to the inside of the card processor forcibly, thereby causing damages to the card processor or the card. Moreover, in the above case, if the card processor had already received from the host system an instruction to take in the card before problems such as the above occurred, the card processor will take the card to the inside when the user inserts the card to the inside of the card processor. However, the card will remain taken to the inside of the card processor because the card processor does not receive any instruction from the host system thereafter. At this time, the user may attempt to take out the card from the inside of the card processor forcibly, or may attempt to insert other card to the inside of the card processor forcibly, thereby causing damages to the card processor or the card.

As one of countermeasures against the case where no instruction is transmitted from the host system to the card processor due to some problems, as described above, conventionally, the card processor determines that the communication from the host system has stopped for a certain period of time, and discharges the card to the outside to return if the card exists in the inside, as described above. However, in the above case, the host system or the card processor becomes inoperable even if the user manipulates something, so the user becomes aware of the trouble immediately, and in order to inform the clerk in charge, the user may take his/her eyes off the card processor, or may leave the installation site of the card processor. For this reason, if the card is returned from the card processor meanwhile, the card may be left at the return area without being taken out, thereby causing damage that the card is stolen by an ill-willed third party. Moreover, an ill-willed third party may attempt to steal the card, as described above, and may stop the communication from the host system to the card processor by intentionally causing the communication line into service interruption, or causing the host system or the card processor into no response or into runaway, or the like. In this way, that due to the stoppage of the communication from the host system the user's attention deviates from the card processor and the card returned to the return area will remain left is more likely to occur than that after the ordinary return in which predetermined processes with respect to the card are completed normally and the card is returned, the user forgets to take out the card and the card will remain left in the return area. Also, in the former case, the responsibility which the administration side, such as a bank or the like, assumes is heavier. On the other hand, as described above, conventionally, the host system determines that the card returned to the return area has not been taken out for a certain period of time, and instructs the card processor to take the card to the inside. However, if the communication line becomes in service interruption, or the host system or the card processor become in no response or in runaway, or the like, and no instruction is thus transmitted to the card processor from the host system, it is impossible to instruct the card processor to take in the card and thus the card may not be taken to the inside, either It is an object of the present invention to provide a card processor capable of autonomously determining to address and suppressing the receiving damages to the minimum in case that the transmission from a host system has stopped due to some problems.

In order to achieve the above objective, according to the present invention, a card processor receiving a card and carrying out predetermined processes, the card processor includes: a take-in unit to take the card to the inside; a return unit to return the card to a return area from the inside; a first detection unit for detecting that the card exists in the inside; a second detection unit for detecting that a card returned to the return area has been taken out; a communication unit to carry out communication with a host system mutually; a first counting unit which, after receiving a command from the host system by means of the communication unit, counts the time after responding to the command and until receiving a next command from the host system; a second counting unit which counts the time after the card is returned to the return area and until the card is taken out; and a control unit which controls the take-in unit, the return unit, the communication unit, the first and second counting units based on the detection results of the first and second detection units. In this configuration, the control unit determines from the detection results of the first and second detection units whether or not the card exists in the inside and whether or not the card exists in the return area, respectively, and in the state that it is judged that the card exists in the inside, if the time counted by the first counting unit has reached a predetermined time while a command from the host system is not received by the communication unit, then the card is returned to the return area by the return unit, and subsequently in the state that it is judged that the returned card exists in the return area, if the time counted by the second counting unit has reached a predetermined time while the card is not taken out from the return area, then the card is taken to the inside by the take-in unit.

That is, the above-described card processor, during attempting to take the card to the inside, autonomously determines whether or not the predetermined time has elapsed while a command from the host system is not received, and if it is determined that the predetermined time has elapsed in this no-reception state, then the card is returned to the return area, and furthermore, subsequently, the above-described card processor autonomously determines whether or not a predetermined time has elapsed while the returned card is not taken out from the return area, and if it is determined that the predetermined time has elapsed in this return state, then the card is taken to the inside, again.

According to the present invention, the receiving damages may be suppressed to the minimum because the card processor autonomously determines and addresses if the transmission from the host system has stopped due to some problems.

Other objects, features and advantages of the invention will become apparent from the following description of the embodiments of the invention taken in conjunction with the accompanying drawings.

BRIEF DESCRIPTION OF THE DRAWINGS

FIG. 1 is a system configuration using a card processor.
FIG. 4 is a view showing the storage contents of a storage unit of a first embodiment.
FIG. 5 is the flowchart of a main card-processing of the first embodiment.
FIG. 6 is the flowchart of a card return/re-take-in process.
FIG. 7 is the flowchart of a card discharge process.
FIG. 8 is the flowchart of a card take-in process.
FIG. 15 is the flowchart of a main card-processing of the second embodiment.
FIG. 16 is the flowchart of a main card-processing of a third embodiment.

DESCRIPTION OF THE EMBODIMENTS

Figure 2:
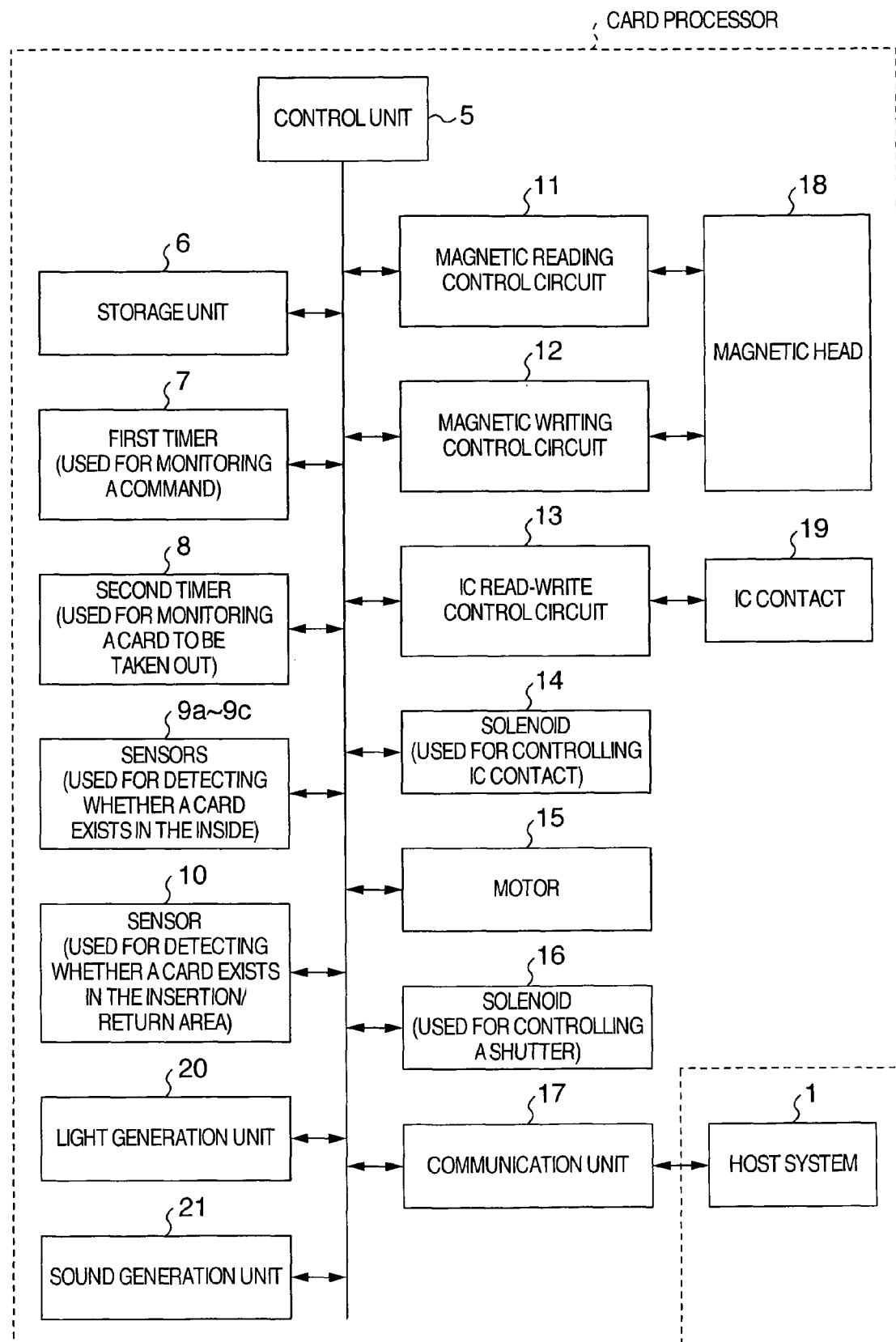
FIG. 2 is an electric block diagram of the card processor.

Hereinafter, embodiments of the present invention will be described with reference to the accompanying drawings. FIG. 1 is a view showing the configuration of a system concerning the present embodiment. This system is employed in financial institutes, such as a bank, and is incorporated into Consumer Transaction Facilities (not shown), such as ATM (Automatic Teller Machine), for example. A host system 1 comprises a personal computer and controls each unit of the Consumer Transaction Facility. A card processor 2 comprises a card reader writer and receives a card 4 and carries out predetermined processes. A power supply 3 supplies driving power to the card processor 2. The card 4 comprises a magnetic card, an IC card, or a magnetic IC card. That is, the card 4 is provided with at least one information recording unit, such as a magnetic stripe or an IC.

The host system 1 is connected to the card processor 2 through cables and interfaces compliant with Standards, such as USB. The host system 1, the card processor 2, and the power supply 3 are provided inside the Consumer Transaction Facility. In addition to these, the Consumer Transaction Facility is provided with a non-illustrated operating unit, display unit, cash receipt unit, cash deposit and withdrawal unit, and the like. A user (customer) carries out predetermined operations at the Consumer Transaction Facility, whereby the host system 1 controls each unit of the Consumer Transaction Facility and thus the transaction of cash deposits and withdrawals, and the like, are carried out. At that time, the user inserts his/her own card 4 to the inside of the card processor 2, and the card processor 2 receives the inserted card 4 and carries out predetermined processes such as reading information from the card 4 (information may be written to the card 4), whereby various transactions which the user requests may be made based on the information read from the card 4.

FIG. 2 is a block diagram showing an electrical configuration of the card processor 2. A control unit 5 comprises a CPU and a memory, such as ROM and RAM. A storage unit 6 comprises a memory, such as SRAM and EEPROM. The control unit 5 controls each unit of the card processor 2. At that time, in the internal memory of the control unit 5 and in the storage unit 6, various kinds of control data and the like are stored as to be readable and writable. A first timer 7 counts the time until receiving a command from the host system 1. A second timer 8 counts the time until the returned card 4 is taken out. The control unit 5 monitors by means of the first timer 7 until a command is transmitted from the host system 1, and monitors by means of the second timer 8 until the returned card 4 is taken out. Sensors 9a to 9c detect the card 4 in the inside of the card processor 2. A sensor 10 detects the card 4 in the insertion/return area of the card processor 2, where the card 4 goes in and out. The control unit 5 detects the position of the card 4 in the inside using detection signals outputted from the sensors 9a to 9c, and detects the insertion or taking-out of the card 4 with respect to the insertion/return area using a detection signal outputted from the sensor 10. A light generation unit 20 comprises a light emitting diode and the like. A sound generation unit 21 comprises a buzzer and the like.

A magnetic reading control circuit 11 reads magnetic information from the magnetic stripe of the card 4 by controlling a magnetic head 18, and processes the magnetic information of after this reading, and transmits this to the control unit 5. A magnetic writing control circuit 12 processes the information transmitted from the control unit 5 and magnetically records (write) the information of after this process to the magnetic stripe of the card 4 by controlling the magnetic head 18. An IC read-write control circuit 13 reads the information from the IC of the card 4 and transmit this to the control unit 5, or writes the information transmitted from the control unit 5 to the IC of the card 4, by controlling an IC contact 19. A solenoid 14 moves the IC contact 19 so as to contact to or separate from an IC contact provided in the card 4. A motor 15 rotates a roller which sandwiches and conveys the card 4. A solenoid 16 opens and closes a shutter which blocks the insertion/return area of the card processor 2. A communication unit 17 comprises an interface (communication circuit) compliant with Standards, such as USB. The control unit 5 carries out communication with the host system 1 mutually by means of the communication unit 17, and thus receives commands from the host system 1 or transmits to the host system 1 the information, which is read from the card 4 through the magnetic head 18 or the IC contact 19.

Figure 3A:
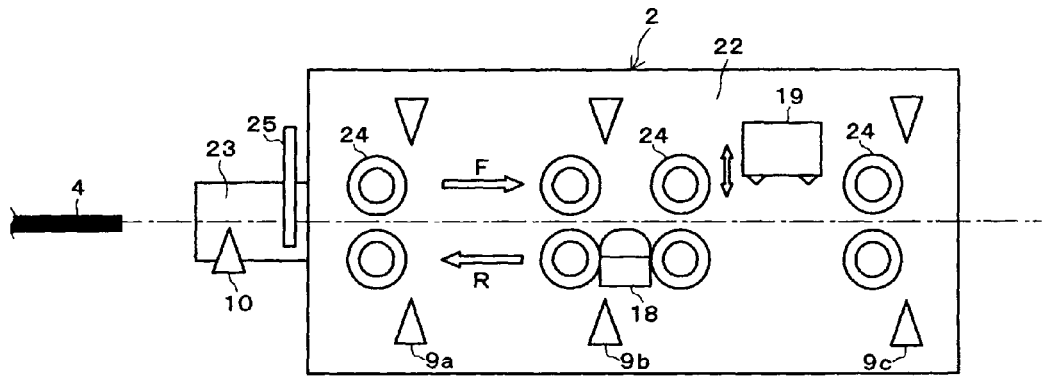
FIG. 3A is the schematic structural drawing of the card processor before inserting a card.
Figure 3B:
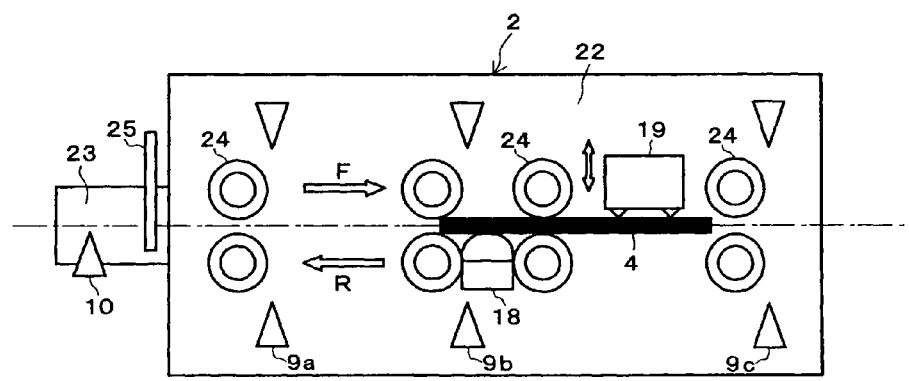
FIG. 3B is the schematic structural drawing of the card processor during inserting a card.
Figure 3C:
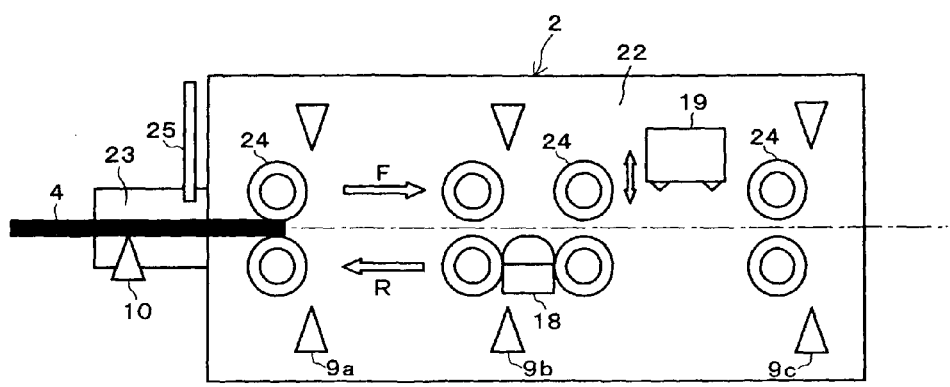
FIG. 3C is the schematic structural drawing of the card processor during returning a card.

FIG. 3A to FIG. 3C are views showing the schematic structure of the card processor 2. In the inside 22 of the card processor 2 there are provided a roller 24, the sensors 9a to 9c, the magnetic head 18, and the IC contact 19. A total of four pairs of rollers 24, one pair consisting of upper and lower rollers, are provided and rotate clockwise or counterclockwise by the drive of the above-described motor 15, and sandwich the card 4 and convey in the F direction or in the R direction. The sensors 9a to 9c comprise photoelectric sensors of a light projection and detection type, whereby the card 4 is detected by interruption of light by the card 4 and thus the sensors 9a to 9c switch from the OFF state to the ON state. The magnetic head 18 is prepared at a position contacting with the magnetic stripe of the card 4 which is to be conveyed by the roller 24. The magnetic head 18 reads the magnetic information from the magnetic stripe or magnetically records information to the magnetic stripe by contacting with the magnetic stripe of the moving card 4. The IC contact 19 is prepared at a position facing to the IC contact of the card 4 (FIG. 3B), which card is conveyed to a predetermined position of the inside 22 by the roller 24 and is stopped. The IC contact 19 moves up and down by the drive of the above-described solenoid 14, and separates from or contacts to the IC contact of the card 4, and reads information from the IC of the card 4 or records information to the IC during this contacting.

In the insertion/return area 23 of the card processor 2 where the card 4 goes in and out, a shutter 25 and the sensor 10 are prepared. The shutter 25 is opened and closed upward and downward by the drive of the above-described solenoid 16. The shutter 25 allows the card 4 to enter the inside 22 or to project from the inside 22 by opening as shown in FIG. 3C, and disables the card 4 and foreign substances to enter the inside 22 or the card 4 to be taken out from the inside 22 to the outside by closing as shown in FIG. 3A and FIG. 3B. The sensor 10 comprises a micro switch, and detects the card 4 by the card 4 of a matching shape contacting to the micro switch, and it thus switches from the OFF state to the ON state.

After receiving, by means of communication unit 17, from the host system 1 a command indicative of an instruction to take the card 4 to the inside 22, if a user inserted the card 4 to the insertion/return area 23, then the sensor 10 detects the card 4, and the control unit 5 which received this detection signal will drive the solenoid 16 to open the shutter 25. On the other hand, if foreign substances of a no-matching shape other than the card 4 are inserted to the insertion/return area 23, the shutter 25 will not open because the sensor 10 does not detect the card 4. After opening the shutter 25, the control unit 5 drives the motor 15 in the forward direction to thereby rotate the roller 24 so as to take the card 4 to the inside 22. Accordingly, the card 4 is inserted further, and when the front end of the card 4 is sandwiched between the rollers 24 at the front side (at the insertion/return area 23 side), the card 4 will be conveyed in the F direction by the roller 24 and be taken to the inside 22. If the sensor 9a at the front side does not detect in a while after detecting the card 4 once, then the control unit 5 drives the solenoid 16 to close the shutter 25.

Then, in the case where the communication unit 17 has already received from the host system 1 a command indicative of an instruction to read information from the magnetic stripe of the card 4, upon detection of the front end of the card 4 by the sensor 9b existing in the center, the control unit 5 will read magnetic information from the magnetic stripe of the card 4 by means of the magnetic head 18 while conveying the card 4. After a while, upon detection of the card 4 by the sensor 9c existing at the back side, the control unit 5 will stop reading by means of the magnetic head 18, and stop the drive of the motor 15 to stop conveying the card 4 by the roller 24. Thereafter, for example, in the case where the communication unit 17 has already received from the host system 1 a command indicative of an instruction to record information to the magnetic stripe of the card 4, the control unit 5 drives the motor 15 in the reverse direction to convey the card 4 in the R direction by the roller 24. Then, upon detection of the card 4 by the sensor 9a at the front side, the control unit 5 switches so as to drive the motor 15 in the forward direction, and conveys the card 4 in the F direction by the roller 24 again, and magnetically records information to the magnetic stripe of the card 4 by means of the magnetic head 18. After a while, upon detection of the card 4 by the sensor 9c existing at the back side, the control unit 5 will stop magnetic recording by means of the magnetic head 18, and stop the drive of the motor 15 to stop conveying the card 4 by the roller 24.

Moreover, in the case where the communication unit 17 has already received from the host system 1 a command indicative of an instruction to read information from the magnetic stripe of the card 4 or a command indicative of an instruction to write information to the IC of the card 4, the control unit 5 conveys the card 4 to a predetermined position where the IC contact of the card 4 faces to the IC contact 19, and stops the drive of the motor 15 to stop the rotation of the roller 24. At this time, the control unit 5 causes the card 4 to rest accurately at the above-described predetermined position by projecting a stopper (not shown) on the conveying path of the card 4. After having rested, the control unit 5 drives the solenoid 14 and sends down the IC contact 19 to come in contact with the IC contact of the card 4. Then, information is read from the IC of the card 4 through the IC contact 19, or information is written to the IC, or the like.

Then, at the time of returning the card 4 to the user, the control unit 5 drives the solenoid 16 to open the shutter 25, and drives the motor 15 in the reverse direction and conveys the card 4 in the R direction by the roller 24. Then, if the sensor 9a does not detect in a while after detecting the card 4 once, then the control unit 5 will stop driving the motor 15 to thereby stop conveying the card 4 by the roller 24. Accordingly, as shown in FIG. 3C, the card 4 is discharged to project from the insertion/return area 23 and becomes ready to be taken out. Moreover, subsequently, at the time of collecting the card 4, the control unit 5 drives the motor 15 in the forward direction to convey the card 4 in the F direction by the roller 24, and collects the card 4 into a collection box (not shown) placed behind the card processor 2 through an opening prepared in the back face (at the opposite side of the insertion/return area 23) of the card processor 2. Then, after the control unit 5 does not detect in a while after detecting the card 4 once by the sensor 9c, the control unit 5 stops the motor 15 and the roller 24.

In the above-described configuration, the control unit 5 constitutes an embodiment of the control unit in the present invention. The first timer 7 constitutes an embodiment of the counting unit and the first counting unit in the present invention. The second timer 8 constitutes an embodiment of the second counting unit in the present invention. The sensors 9a to 9c constitute an embodiment of the first detection unit in the present invention. The sensor 10 constitutes an embodiment of the second detection unit in the present invention. The motor 15 and roller 24 constitute an embodiment of the take-in/return unit in the present invention. The communication unit 17 constitutes an embodiment of the communication unit in the present invention.

Next, a first embodiment of the present invention will be described with reference to FIG. 4 to FIG. 13. FIG. 4 is a view showing an example of the storage contents of the storage unit 6. In the storage unit 6, there is prepared a region (within a box shown as a thick solid line in FIG. 4), where processes which are to be carried out as the communication error process when a predetermined time has elapsed while a command from the host system is not yet received 1 by the communication unit 17, and the execution sequence of these processes are set. In the example of FIG. 4, as shown within a solid line box at the right, carrying out a "card return/re-take-in process", firstly, and carrying out a "no-command transmission informing process", secondly, are set. The other setting candidates include a "hardware reset process", a "card processing re-execution inhibit process", a "command standby process", and a "transaction not ready informing process" (within a box shown as a narrow dashed line in FIG. 4).

Each process of the above-described setting candidates is a process considered in advance in order to address that the card processor 2 does not receive a command from the host system 1. More specifically, the "card return/re-take-in process" is a process of returning the card 4 existing in the inside 22 to the insertion/return area 23 and of taking the returned card 4 to the inside 22 again if the returned card 4 has not been taken out. The "no-command transmission informing process" is a process of informing the host system 1 of the fact that a command is not transmitted. The "hardware reset process" is a process of returning to an initial state like at the time of having activated the card processor 2 by supplying electric power from the power supply 3. The "card processing re-execution inhibit process" is a process of inhibit-setting so that the processes with respect to the card 4 shown in FIG. 5 and the like are not carried out thereafter. The "command standby process" is a process of standing by, further for a while, to receive a command from the host system 1. The "transaction not ready informing process" is a process of informing the user of the fact that transaction may not be made.

Returning the card 4 existing in the inside 22 in the "card return/re-take-in process", and informing the user of the fact that transaction may not be made in the "transaction not ready informing process" are designed to let the user to recognize that transaction may not be made, so as not to be confused with the following problems, thereby preventing the card processor 2, host system 1, and card 4 from being destroyed, in case that problems, such as that the communication line between the host system 1 and the card processor 2 becomes in service interruption, or that the host system 1 and the card processor 2, for some reason, become in no response (a state of hang-up, freezing, etc.), or in runaway (a state where programs were carried out abnormally, resulting in out-of-control, or in a conflicting state between the host system 1 and the card processor 2) occurred. Re-taking in the card 4 which was returned in the "card return/re-take-in process" is designed to prevent the card 4 from being stolen and ill-used by the third party, in case that the returned card 4 remains left without being taken out by the user.

Informing the host system 1 of the fact that a command is not transmitted in the "no-command transmission informing process" is designed to prompt the host system 1 to transmit (or retransmit) a certain command, such as a command to stand by to receive a command for a while, or a command which had already been transmitted but has not been received yet, etc., in case that inquiry of ID/password, etc. is carried out between the host system 1 and a central server, etc. of a bank using a telephone line, etc. and this communication takes time and delays the transmission of a command from the host system 1 to the card processor 2, or in case that the communication line between the host system 1 and the card processor 2 temporarily becomes in service interruption due to noises, etc. and a command from the host system 1 has not been received by the card processor 2.

Returning the card processor 2 to the initial state in the "hardware reset process" is designed to initialize a program which establishes a state capable of mutually communicating with the host system 1, or a processing program, etc. with respect to the card 4, as shown in FIG. 5, etc., and re-execute from the beginning, thereby dissolving the following problems, in case that problems, such as that the host system 1 or the card processor 2 becomes in no response or in runaway, occurred.

Inhibit-setting so as not to carry out processes with respect to the card 4 thereafter in the "card processing re-execution inhibit process" is designed to prevent the communication error process from being carried out unlimitedly and wastefully, in case that a state, where the above-described problems are not dissolved and a command from the host system 1 is not received, has continued.

Standing by to receive a command from the host system 1 in the "command standby process" is designed to substantially extend the standby time to receive a command, in case that communication between the host system 1 and a central server, etc. takes time and delays the transmission of a command from the host system 1.

Possible problems are assumed before introducing the system of FIG. 1, and in order to address these problems, a single or a plurality of processes carried out as the communication error process among the processes of the above-described setting candidates and the execution sequence of these processes are determined and written and set to the predetermined region of the storage unit 6 by a writing device consisting of the host system 1 or other personal computer, or the like, as shown in FIG. 4. Moreover, during the operation of the system, the processes carried out as the communication error process and their execution sequence are changed suitably and overwritten to the predetermined region of the storage unit 6 by the host system 1 or the like, to thereby change the setting. All the processing programs of the above-described setting candidates may be stored to the storage unit 6 in advance, or only some of the processing programs which are set as to be carried out as the communication error process may be stored to the storage unit 6 in advance. In the case where only some of the processing programs are stored, a newly set processing program just needs to be stored additionally to the storage unit 6 or a processing program no longer required just needs to be deleted, when the settings have been changed. By storing only some of the processing programs or by deleting a processing program no longer required, a memory with a large storage capacity does not need to be used as the storage unit 6, and thus the cost increase of the card processor 2 may be suppressed. The storage unit 6 constitutes an embodiment of the setting unit in the present invention.

FIG. 5 to FIG. 13 are flowcharts showing the procedures of the processes carried out by the card processor 2. Each process is carried out by the control unit 5. FIG. 5 is the flowchart showing the procedure of a main card-processing. This main card-processing is the process in the case where the reception of a command from the host system 1 is always monitored while the card 4 exists in the inside 22 of the card processor 2. After electric power is supplied from the power supply 3 and the card processor 2 is activated, the control unit 5 sets a predetermined time T1, which is compared with the time until receiving a command from the host system 1, the time being counted by the first timer 7, and a predetermined time T2, which is compared with the time during which the card 4 is not taken out from the insertion/return area 23, the time being counted by the second timer 8, respectively (Step S1). The set values of the predetermined times T1 and T2 may be stored to the storage unit 6 in advance, or may be received from the host system 1 by inquiring the host system 1 at the time of this setting. Moreover, it is preferable that the predetermined time T1 be set longer than the time not making the user uneasy even if the process is delayed temporarily at the card processor 2 or at the host system 1 because the card processor 2 does not receive a command from the host system 1, and that the predetermined time T1 be set shorter than the average time it takes until the card processor 2 receives a command from the host system 1 when the card processor 2 and the host system 1 are in the normal state. Moreover, it is preferable that the predetermined time T2 be set longer than the average time during which a user who is the owner of the card 4, the user being at the installation site of the card processor 2, may take out the card 4 returned to the insertion/return area 23, and that the predetermined time T2 be set shorter than the average time it takes after the user left the installation site of the card processor 2 and until a stranger comes to the installation site of the card processor 2.

After setting the predetermined times T1 and T2, the control unit 5 determines whether or not the card 4 exists in the inside 22 of the card processor 2 from the detection results of the sensors 9a to 9c (Step S2). At this time, if the card 4 has not been inserted to the insertion/return area 23 or to the inside 22 of the card processor 2 by the user, all the sensors 9a to 9c are in the OFF state and the card 4 does not exist in the inside 22 (Step S2; NO), so the control unit 5 will wait for either one of the sensors 9a to 9c to detect the card 4 and become in the ON state.

Then, after a command indicating to take in the card 4 is received from the host system 1, the card 4 is inserted to the insertion/return area 23 by the user, and if the card 4 has been taken to the inside 22 by the drive of the motor 15 in the forward direction and the rotation of the roller 24, as described above, then either one of the sensors 9a to 9c detects the card 4 and becomes in the ON state. Accordingly, the control unit 5 determines that the card 4 exists in the inside 22 (Step S2: YES), and zero-clears (set the count value to zero) the first timer 7 (Step S3). Next, in order to count the time until receiving a command from the host system 1, the control unit 5 starts the first timer 7 (start to count) (Step S4), and determines whether or not the communication unit 17 has received a command from the host system 1 (Step S5). At this time, if it has not received the command from the host system 1 (Step S5: NO), the control unit 5 determines whether or not the time counted by the first timer 7 has reached the predetermined time T1 with reference to the first timer 7 (Step S6). At this time, if the counted time of the first timer 7 has not reached the predetermined time T1 (Step S6: NO), the control unit 5 determines again whether or not the communication unit 17 has received a command from the host system 1 (Step S5), and if it has not received yet (Step S5: NO), then the control unit 5 determines again whether or not the counted time of the first timer 7 has reached the predetermined time T1 (Step S6).

Then, before the counted time of the first timer 7 reaches the predetermined time T1 (Step S6: NO) while standing by to receive the command from the host system 1 at Steps S5 and S6, if it has received the command from the host system 1 (Step S5: YES), then the control unit 5 stops the first timer 7 (stops counting) (Step S7). Then, the control unit 5 carries out the process in accordance with the received command (Step S8). The process carried out at this time include, for example, reading information from the card 4, writing information to the card 4, discharging (returning) the card 4 to the outside, and the like. After carrying out this process, the control unit 5 responds (replies) to the host system 1 the result of this process through the communication unit 17 (Step S9). The results to respond at this time, include, for example, information read from the card 4, a code for reporting the completion of the process of the received command, and the like.

After responding, the control unit 5 determines again whether or not the card 4 exists in the inside 22 of the card processor 2 (Step S2). At this time, if the card 4 exists in the inside 22 (Step S2: YES), the control unit 5 zero-clears the first timer 7 (Step S3), and starts the first timer 7 in order to count the time until receiving a next command from the host system 1 (Step S4), and determines whether or not it has received the command from the host system 1 (Step S5). Then, in accordance with this judgment result, the control unit 5 carries out Step S6, or Steps S7 to S9, and the like, as described above.

On the other hand, when the counted time of the first timer 7 reaches the predetermined time T1 at Step S6 (Step S6: YES) without receiving a command from the host system 1 at Step S5 (Step S5: NO), the control unit 5 will read the setting region (FIG. 4) of the communication error processes of the storage unit 6 and carry out the communication error processes one by one in the set sequence (Step S10). Because carrying out the card return/re-take-in process is set firstly as the communication error process in the example of FIG. 4, the control unit 5 reads the program of the card return/re-take-in process from the storage unit 6 and carries out the same.

FIG. 6 is the flowchart showing the procedure of the card return/re-take-in process. After stating the card return/re-take-in process, the control unit 5 carries out the card discharge process in order to return the card 4 existing in the inside 22 to the user (Step S21). FIG. 7 is the flowchart showing the detailed procedure of the card discharge process. In FIG. 7, first, the control unit 5 drives the solenoid 16 to open the shutter 25 (Step S31), drives the motor 15 in the reverse direction (Step S32) to convey the card 4 toward the insertion/return area 23 by the rotation of the roller 24. Then, when the sensor 9a detected the card 4 once and becomes in the ON state, and after a while it does not detect and becomes in the OFF state (Step S33: YES), the control unit 5 will stop to drive the motor 15 (Step S34) to stop conveying the card 4 by the roller 24. Thereby, the card 4 is discharged to the insertion/return area 23 (in the state of FIG. 3C) and becomes ready to be taken out.

After carrying out the card discharge process, the control unit 5 zero-clears the second timer 8 (Step S22 of FIG. 6), and starts the second timer 8 (Step S23) in order to count the time during which the returned card 4 is not taken out from the insertion/return area 23, and determines from the detection result of the sensor 10 whether or not the card 4 has been taken out from the insertion/return area 23 (Step S24). At this time, if the sensor 10 has not detected the card 4 and is in the OFF state, the control unit 5 determines that the card 4 has been taken out (Step S24: YES), and moves to Step S2 of the main card-processing of FIG. 5, and determines again whether or not the card 4 exists in the inside 22 of the card processor 2, and will carry out the processes of after Step S3, repeatedly, as described above. On the other hand, if the sensor 10 has detected the card 4 at Step S24 of FIG. 6 and is in the ON state, the control unit 5 determines that the card 4 has not been taken out (Step S24: NO), and determines, with reference to the second timer 8, whether or not the time counted by the second timer 8 has reached the predetermined time T2 (Step S25). At this time, if the counted time of the second timer 8 has not reached the predetermined time T2 (Step S25: NO), the control unit 5 determines again whether or not the card 4 has been taken out from the insertion/return area 23 (Step S24), and if it has not been taken out yet (Step S24: NO), determines again whether or not the counted time of the second timer 8 has reached the predetermined time T2 (Step S25).

Then, in the state of waiting for the card 4, which has been returned at Steps S24 and S25, to be taken out, if the counted time of the second timer 8 has reached the predetermined time T2 (Step S25: YES) while the card 4 is not taken out from the insertion/return area 23 (Step S24: NO), the control unit 5 carries out the card take-in process in order to take the card 4 existing in the insertion/return area 23 to the inside 22 (Step S26), again. FIG. 8 is the flowchart showing the detailed procedure of the card take-in process. In FIG. 8, first, the control unit 5 drives the solenoid 16 to open the shutter 25 (Step S41), drives the motor 15 in the forward direction (Step S42) to convey the card 4 toward the inside 22 by rotation of the roller 24. Then, when the sensor 9a detected the card 4 once and becomes in the ON state and after a while it does not detect and becomes in the OFF state (Step S43: YES), the control unit 5 will drive the solenoid 16 to close the shutter 25 (Step S44). After this, if the sensor 9c detected the card 4 and becomes in the ON state from the OFF state (Step S45: YES), the control unit 5 will stop to drive the motor 15 (Step S46), and stop conveying the card 4 by the roller 24. Thereby, the card 4 is taken to the inside 22 from the insertion/return area 23. After carrying out the card take-in process, the control unit 5 stops the second timer 8 (Step S27 of FIG. 6), terminates the card return/re-take-in process, and moves to Step S11 of FIG. 5.

After completing carrying out one communication error process, as described above, the control unit 5 determines whether or not the communication unit 17 has received a command from the host system 1 at Step S11 of FIG. 5, and if it has received (Step S11: YES), the communication unit 17 carries out Steps S7 to S9, as described above, and moves to Step S2. On the other hand, if the communication unit 17 has not received the command from the host system 1 at Step S11 (Step S11: NO), the control unit 5 determines whether or not the last communication error process set in the storage unit 6 has been carried out (Step S12). Because in the example of FIG. 4, as the communication error process, carrying out the no-command transmission informing process lastly (secondly) is set, the control unit 5 determines that the set last communication error process has not been carried out yet (Step S12: NO), and moves to Step S10, and reads from the storage unit 6 a program of the no-command transmission informing process and carry out the same.

Figure 11:
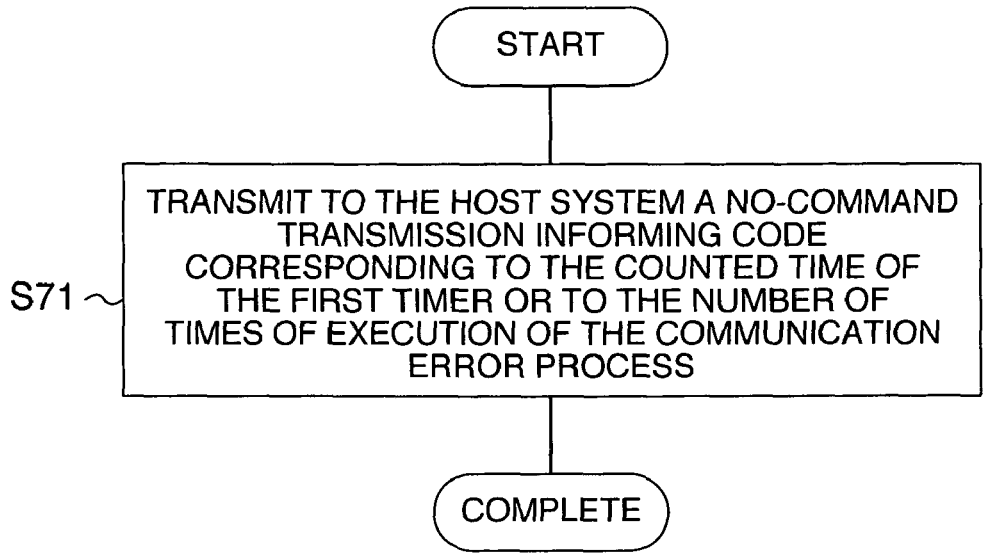
FIG. 11 is the flowchart of a no-command transmission informing process.

FIG. 11 is the flowchart showing the procedure of the no-command transmission informing process. When the no-command transmission informing process is started, the control unit 5 will transmit a no-command transmission informing code corresponding to the counted time of the first timer 7 or to the number of times of execution of the communication error process at this time, to the host system 1 through the communication unit 17 (Step S71). Specifically, for example, a code which indicates that the predetermined time has further elapsed while a command from the host system is not received 1 after the predetermined-time T1 elapsed, or a code which indicates that the no-command transmission informing process, which has started at this time, corresponds to which times of the communication error process (the second time in the example of FIG. 4), or the like, is stored to the predetermined region of the storage unit 6 in advance, from which the control unit 5 will read a corresponding code and transmit to the host system 1. Informing the host system 1 of the state of no command-transmission just needs to be in the mode capable of informing the host system 1 of the fact that time is continuously elapsing without receiving a command from the host system 1. After transmission, the control unit 5 terminates the no-command transmission informing process and moves to Step S11 of FIG. 5.

Figure 9:
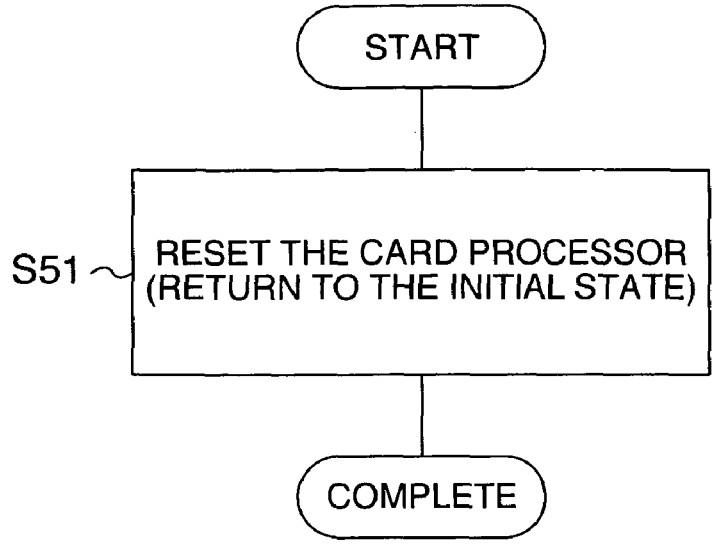
FIG. 9 is the flowchart of a hardware reset process.

On the other hand, when the hardware reset process is set to the storage unit 6 as the communication error process, the control unit 5 carries out the hardware reset process at Step 10 of FIG. 5. FIG. 9 is the flowchart showing the procedure of the hardware reset process. When the hardware reset process is started, the control unit 5 will reset each unit of the card processor 2 so as to return to the initial state (Step S51). After resetting, for example, the control unit 5 carries out again, from the beginning, a processing program for establishing a state where the two way communication between the host system 1 and the card processor 2 is possible, and carries out again the main card-processing of FIG. 5 from the beginning.

Figure 10:
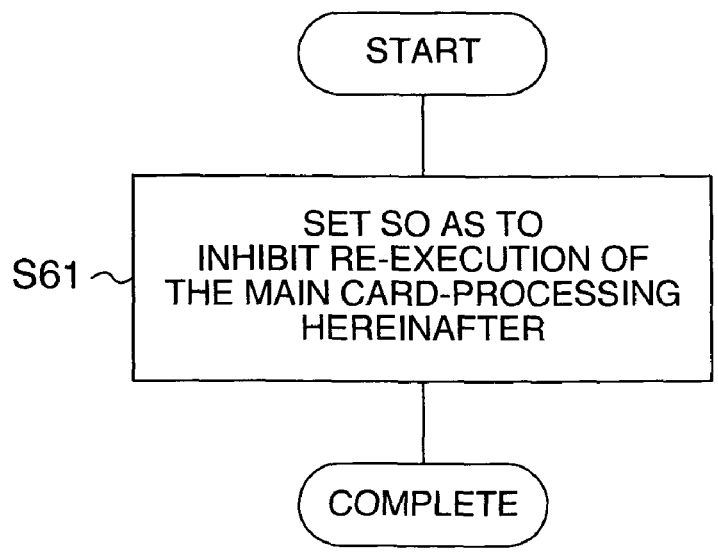
FIG. 10 is the flowchart of a card processing re-execution inhibit process.

Moreover, when the card processing re-execution inhibit process is set to the storage unit 6 as the communication error process, the control unit 5 carries out the card processing re-execution inhibit process at Step 10 of FIG. 5. FIG. 10 is the flowchart showing the procedure of the card processing re-execution inhibit process. When the card processing re-execution inhibit process is started, the control unit 5 will set so as to inhibit re-execution of the main card-processing of FIG. 5 hereinafter (Step S61). Specifically, a flag which allows or inhibits execution of the main card-processing, the flag being set in the predetermined region of the storage unit 6 in advance, is changed to the state of "1" indicative of inhibition. After setting, the control unit 5 terminates the card processing re-execution inhibit process and moves to Step S11 of FIG. 5. Then, after that, when the currently running main card-processing is completed as describe later, the control unit 5 will not carry out the main card-processing hereinafter as long as the above-described flag is in the state of "1". In addition, when the card processor 2 is reactivated or reset, the control unit 5 will return the above-described flag to the state of "0" indicative of permission of execution of the main card-processing, and carry out the main card-processing.

Figure 12:
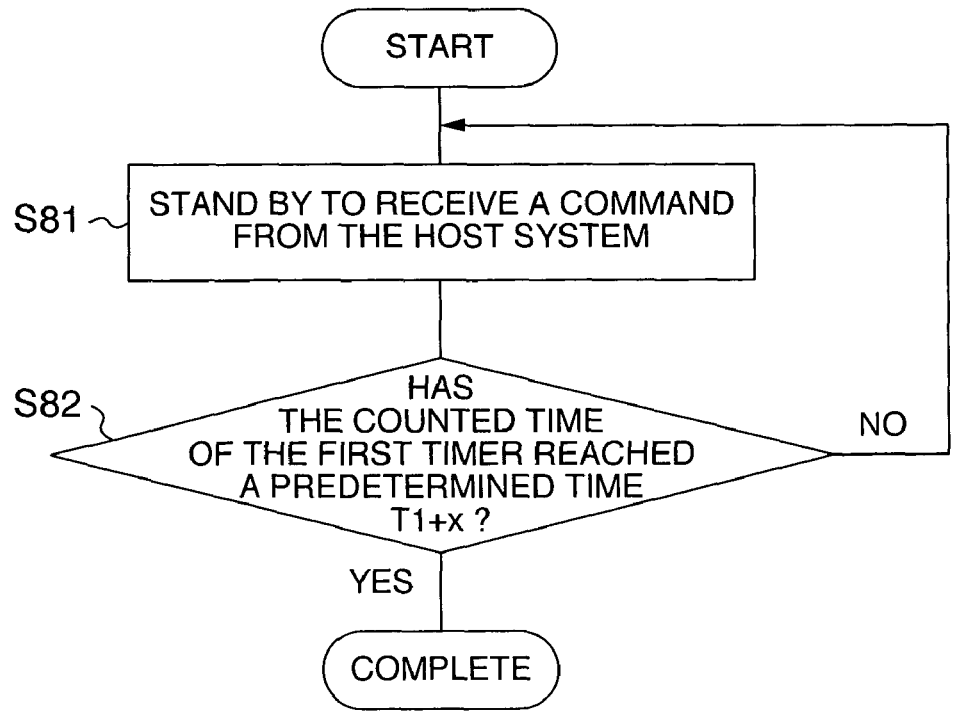
FIG. 12 is the flowchart of a command receipt standby process.

Moreover, when the command reception standby process is set to the storage unit 6 as the communication error process, the control unit 5 carries out the command reception standby process at Step 10 of FIG. 5. FIG. 12 is the flowchart showing the procedure of the command reception standby process. When the command reception standby process is started, the control unit 5 stands by to receive a command from the host system 1 by the communication unit 17 (Step S81), and determines, with reference to the first timer 7, whether or not the counted time of the first timer 7 has reached a predetermined time T1+x (T1<T1+x) (Step S82). Then, if the counted time of the first timer 7 has reached the predetermined time T1+x (Step S82: YES), the control unit 5 will terminate the command reception standby process and move to Step S11 of FIG. 5.

Figure 13:
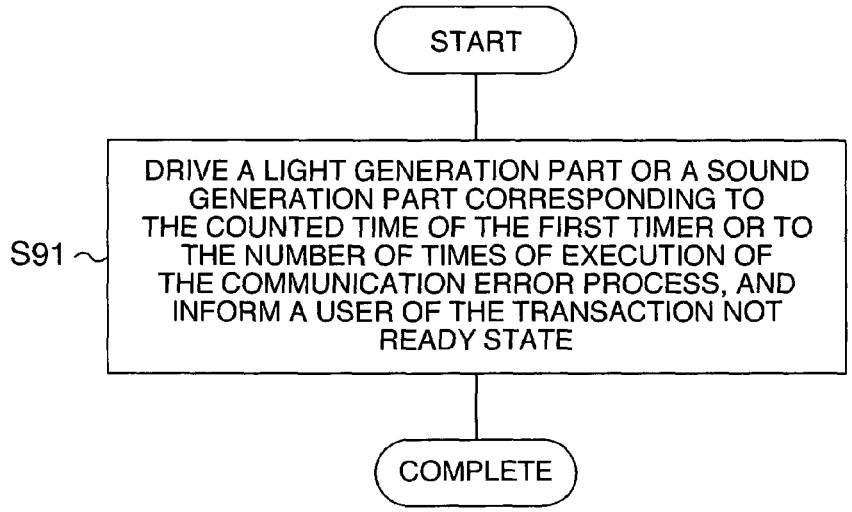
FIG. 13 is the flowchart of a transaction not ready informing process.

Moreover, when the transaction not ready informing process is set to the storage unit 6 as the communication error process, the control unit 5 carries out the transaction not ready informing process at Step 10 of FIG. 5. FIG. 13 is the flowchart showing the procedure of the transaction not ready informing process. When the transaction not ready informing process is started, the control unit 5 will drive the light generation unit 20 or the sound generation unit 21 corresponding to the counted time of the first timer 7 or to the number of times of execution of the communication error process at this time, and will inform the user of the transaction not ready state where the transaction by the card 4 may not be made (Step S91). Specifically, if a predetermined time has elapsed further after the predetermined time T1 without receiving a command from the host system 1, the light generation unit 20 will be lighted, and if a predetermined time longer than that has elapsed, the light generation unit 20 will be blinked. Moreover, for example, if the transaction not ready informing process which has started at this time is the first communication error process, a short sound will be generated from the sound generation unit 21, and if it is the second communication error process, a prolonged sound will be generated from the sound generation unit 21. That is, informing the user of the transaction not ready state just needs to be in the mode capable of informing the user of the fact that time is continuously elapsing without receiving a command from the host system 1. After informing, the control unit 5 terminates the transaction not ready informing process and moves to Step S11 of FIG. 5.

After moving to Step S11 of FIG. 5, if the control unit 5, without receiving a command from the host system 1 (Step S11: NO), determines that the last communication error process set to the storage unit 6 has been carried out (Step S12: YES), it will stop the first timer 7 (Step S13) and terminate the main card-processing. Subsequently, after the passage of the predetermined time or when having received from the host system 1 a command indicative of starting execution of the main card-processing, the control unit 5 starts execution of the main card-processing only if the flag allowing or inhibiting execution of the main card-processing described above is in the state of "0" indicative of permission. Moreover, when the card processor 2 is reactivated or reset, the control unit 5 will start execution of the main card-processing.

According to the first embodiment described above, in the state of currently taking the card 4 to the inside 22 of the card processor 2, if transmission of a command from the host system 1 to the card processor 2 has stopped due to some problems, then the card processor 2 autonomously determines whether or not the predetermined time T1 has elapsed without receiving a command from the host system 1, and if it is determined that the predetermined time T1 has elapsed, then the communication error processes, which are set assuming possible problems in advance, are carried out to address, and therefore the receiving damages may be suppressed to the minimum.

Specifically, in the case where the card return/re-take-in process is set as the communication error process, even if transmission of a command from the host system 1 has stopped due to some problems and thus the contents displayed on the display unit of the host system 1 conflict with the state of the card processor 2, the card processor 2 will return the card 4 of the inside 22 to the insertion/return area 23 if it is determined that the predetermined time T1 has elapsed without receiving a command from the host system 1. It is therefore possible to let the user to recognize that the transaction may not be made, thereby preventing the confusion with the above-described conflict. Then accordingly, it is possible to prevent the occurrence of damages: that the user attempts to take out the card 4 from the inside 22 forcibly or attempts to insert other card to the inside 22 forcibly, thereby damaging the card processor 2 and card 4; and that the user handles the host system 1 violently, thereby damaging the same. Moreover, as described above, after returning the card 4, if the card processor 2 determines that the predetermined time T2 has elapsed while the returned card 4 is not taken out from the insertion/return area 23, then the card 4 will be taken again to the inside 22, so it is possible to prevent the occurrence of a damage that the card 4, which was returned from the card processor 2 and remains left, is stolen and ill-used by an ill-willed third party.

Moreover, in the case where the hardware reset process is set as the communication error process, even if transmission of a command from the host system 1 has stopped due to the problem that the host system 1 or the card processor 2 becomes in no-response or in runaway, the card processor 2 will reset to return to the initial state and initialize a program for establishing a state where two way communication with the host system 1 is possible, a program for the main card-processing, and the like, and then carry them out again from the beginning, so it is possible to dissolve the above-described problems.

Moreover, in the case where carrying out the card processing re-execution inhibit process is set as the communication error process, even if after the problems, such as that the communication line between the host system 1 and the card processor 2 becomes in service interruption, or that the host system 1 or the card processor 2 becomes in no response or in runaway, occurred, and a state of not receiving a command from the host system 1 continues without the above problems being dissolved, the card processor 2 will inhibit execution of the main card-processing thereafter, so it is possible to prevent the communication error process from being carried out unlimitedly and wastefully.

Moreover, in the case where carrying out the no-command transmission informing process is set as the communication error process, even if inquiry of ID/password, or the like, is carried out between the host system 1 and a central server, or the like, of a bank using a telephone line or the like, and this communication takes time and delays the transmission of a command from the host system 1 to the card processor 2, or the communication line between the host system 1 and the card processor 2 temporarily becomes in service interruption due to noises or the like so that commands from the host system 1 are not received by the card processor 2, the card processor 2 will inform the host system 1 of the fact that a command is not transmitted to the host system 1. It is therefore possible to prompt the host system 1 to transmit (or retransmit) certain commands, such as a command to wait for receiving a command for a while, and a command which had already been transmitted but has not been received yet, or the like. Moreover, by receiving this command, the card processor 2 may, assuming that the host system 1 is normal, continue the process corresponding to this command. Moreover, by changing the informing mode corresponding to the elapsed time in the state of not receiving a command from the host system 1, or to the number of times of execution of the communication error process, it is possible to make the host system 1 aware more in detail of the situation of not receiving a command.

Moreover, in the case where carrying out the command standby process as the communication error process is set, even if communication between the host system 1 and a central server, or the like, took time and delays the transmission of a command from the host system 1, the card processor 2 will extend substantially the time to stand by to receive the command from the host system 1, so the card processor 2 may receive the command which was transmitted later from the host system 1, as described above, and continue the process corresponding to this command.

Moreover, in the case where carrying out the transaction not ready informing process is set as the communication error process, even if transmission of a command from the host system 1 has stopped due to some problems and the display contents of the display of the host system 1 conflict with the state of the card processor 2, the card processor 2 will inform the user of the fact that transactions may not be made. It is therefore possible to let the user to recognize that the transaction may not be made, thereby preventing the confusion with the above-described conflict. Then accordingly, it is possible to prevent the occurrence of damages: that the user attempts to take out the card 4 from the inside 22 forcibly or attempts to insert other card to the inside 22 forcibly, thereby damaging the card processor 2 and card 4; and that the user handles the host system 1 violently, thereby damaging the same. Moreover, by changing the informing mode corresponding to the elapsed time in the state of not receiving a command from the host system 1 or to the number of times of execution of the communication error process, it is possible to let the user to recognize more specifically the situation where the transaction may not be made.

Moreover, in the case where the transmission of a command from the host system 1 tends to stop due to some problems as the communication of a command or a response to the command are repeated several times between the host system 1 and the card processor 2, even if the transmission of the command from the host system 1 has stopped along the above tendency, the card processor 2, after receiving from the host system 1 a command indicating to take in the card 4 and taking the card 4 to the inside 22, will always monitor the reception of a command from the host system 1 while the card 4 exists in the inside 22. Therefore, the card processor 2 may always autonomously determine to carry out and address the communication error process promptly. Moreover, in the case where, for the purpose of power saving or the like, the system consisting of the host system 1 and card processor 2 is set so that a command is not transmitted from the host system 1 to the card processor 2 while the card 4 does not exist in the inside 22, even if the predetermined time has elapsed without receiving a command from the host system 1, the card processor 2, assuming that the host system 1 is normal, may continue the process because the card processor 2 does not monitor reception of a command from the host system 1 while the card 4 does not exist in the inside 22.

Moreover, by selecting, among the above-described processes, the processes carried out as the communication error process and combining the different or similar processes in various ways to set to the storage unit 6, it is possible to achieve more effectively dissolving the problems and preventing the receiving damages from occurring. Moreover, also by changing the processes carried out as the communication error process, corresponding to the problems which recently occurred frequently, and by setting again, it is possible to achieve more effectively dissolving the problems and preventing the receiving damages from occurring. Moreover, also by repeatedly carrying out the main card-processing periodically, it is possible to achieve more effectively dissolving the problems and preventing the receiving damages from occurring.

Figure 14:
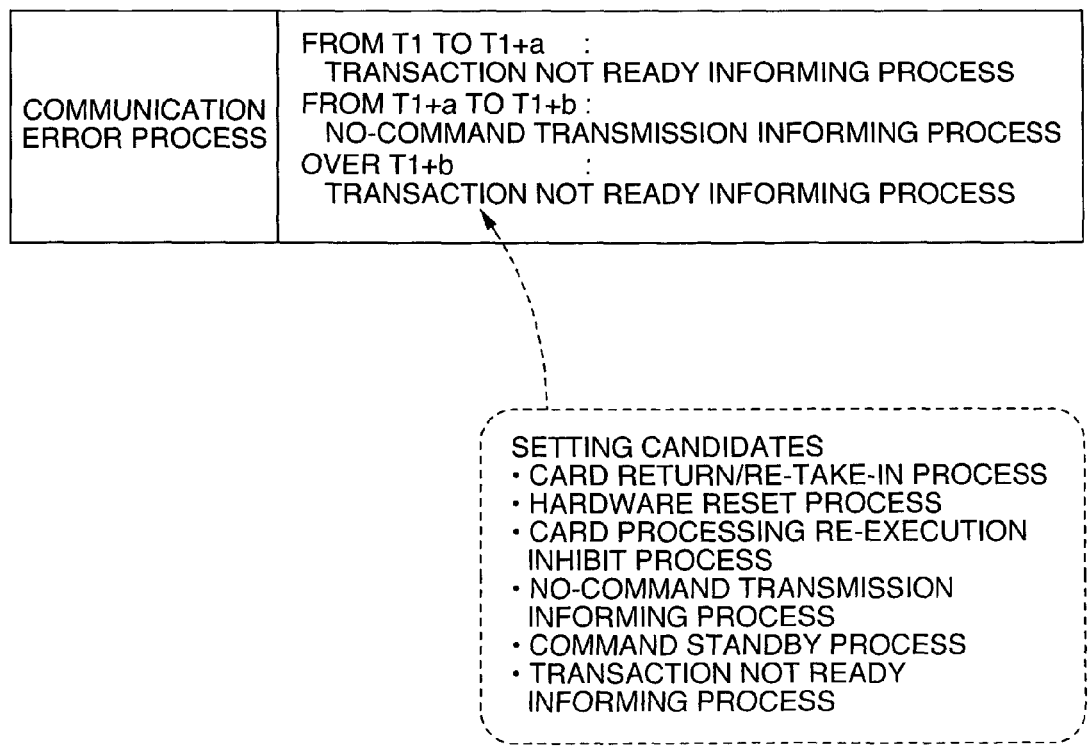
FIG. 14 is a view showing the storage contents of a storage unit of a second embodiment.

Next, a second embodiment of the present invention will be described with reference to FIG. 14 and FIG. 15. FIG. 14 is a view showing an example of the storage contents of the storage unit 6. In the storage unit 6, there is provided a region where the processes, which are carried out as the communication error process when the above predetermined time T1 has elapsed without receiving a command from the host system 1 by the communication unit 17, and the execution timing of these processes are set in advance. In the example of FIG. 14, as the communication error processes as shown within a solid line box at the right, that the "transaction not ready informing process" is carried out after the time T1 elapsed and until the time T1+a elapses, that the "no-command transmission informing process" is carried out after the time T1+a elapsed and until the time T1+b elapses, and that the "transaction not ready informing process" is carried out again after the time T1+b has elapsed, are set (T1<T1+a<T1+b). Setting candidates other than these include the "card return/re-take-in process", "hardware reset process", "card processing re-execution inhibit process", and "command standby process". The detail of these processes each is as already described above. Moreover, the setting of the processes carried out as the communication error process is also as already described above.

FIG. 15 is the flowchart showing the procedure of a main card-processing. The main card-processing of FIG. 15 is the process in the case where reception of a command is monitored only after the card 4 is taken to the inside 22 of the card processor 2 and until receiving a first command from the host system 1. Moreover, in the main card-processing of FIG. 15, the same numerals are given to the same units as those of the main card-processing of FIG. 5 described above. When the card processor 2 is activated, the control unit 5 sets the predetermined time T1 and predetermined time T2, respectively (Step S1), and determines whether or not the card 4 exists in the inside 22 of the card processor 2 (Step S2). Then, the card 4 inserted by a user is taken to the inside 22 by means of the motor 15 and roller 24, and if one of the sensors 9a to 9c detected the card 4 and becomes in the ON state, then the control unit 5 determines that the card 4 exists in the inside 22 (Step S2: YES), and zero-clears the first timer 7 (Step S3), and starts the first timer 7 in order to count the time after taking the card 4 to the inside 22 and until receiving a first command from the host system 1 (Step S4). Then, the control unit 5 determines whether or not the communication unit 17 has received a command from the host system 1 (Step S5). At this time, if the communication unit 17 has not received the first command from the host system 1 (Step S5: NO), the control unit 5 determines whether or not the time counted by the first timer 7 has reached the predetermined time T1 (Step S6), and if it has not reached yet (Step S6: NO), the control unit 5 determines again whether or not the communication unit 17 has received a command from the host system 1 (Step S5).

Then, while standing by to receive a command from the host system 1 at Steps S5 and S6, if a first command is received from the host system 1 (Step S5: YES) before the counted time of the first timer 7 reaches the predetermined time T1 (Step S6: NO), then the control unit 5 stops the first timer 7 (Step S7) and carries out the process in accordance with the received command (Step S8). After carrying out the process, the control unit 5 responds the result of the process to the host system 1 by means of the communication unit 17 (Step S9), and determines whether or not the card 4 has been discharged to the insertion/return area 23 (Step S15). If the command received from the host system 1 at Step S5 is a command which indicates other than discharging the card 4, and the process other than the card discharge process is carried out at Step S8, then the control unit 5 determines that the card 4 has not been discharged to the insertion/return area 23 at Step S15 (Step S15: NO) and waits for receiving a next command from the host system 1 (Step S16). Then, when the next command is received from the host system 1 (Step S16: YES), the control unit 5 moves to Step S8 and carries out the process in accordance with the received command, and then carries out Steps S9, S15, and S16, as described above. Moreover, if the command received from the host system 1 at Step S5 or Step S16 is a command indicating to discharge the card 4, and the card discharge process is carried out at Step S8, then the control unit 5 determines that the card 4 has been discharged to the insertion/return area 23 at Step S15 (Step S15: YES), and moves to Step S2 and again waits for the card 4 to be inserted to the card processor 2 and taken to the inside 22.

On the other hand, while the communication unit 17 has not received the first command from the host system 1 at Step S5 (Step S5: NO), if the counted time of the first timer 7 reaches the predetermined time T1 at Step S6 (Step S6: YES), the control unit 5 reads the setting region (FIG. 14) of the communication error process of the storage unit 6, and carries out the set communication error processes one by one corresponding to the counted time of the first timer 7 at this time (Step S17). Because in the example of FIG. 14, carrying out the transaction not ready informing process is set as the communication error process until the time T1+a has elapsed, the control unit 5 firstly reads from the storage unit 6 a program of the transaction not ready informing process of FIG. 13, and carried out the same, as described above.

Then, after completing carrying out one communication error process, the control unit 5 determines whether or not the communication unit 17 has received a command from the host system 1 at Step S11 of FIG. 15, and if it has received (Step S11: YES), then the control unit 5 carries out Steps S7 to S9, and S15, or the like, as described above. On the other hand, if the communication unit 17 has not received the command from the host system 1 at Step S11 (Step S11: NO), the control unit 5 determines whether or not the last communication error process set in the storage unit 6 has been carried out (Step S12). Because in the example of FIG. 14, carrying out, after the time T1+b has elapsed, the transaction not ready informing process as the last communication error process is set, the control unit 5 determines that the last communication error process set at Step S12 has not been carried out (Step S12: NO). Then, the control unit 5 moves to Step S17 and, as described above, carries out, as the communication error process, the set "no-command transmission informing process" or "transaction not ready informing process" corresponding to the counted time of the first timer 7 at this time. After carrying out the communication error process, if the control unit 5 determines, without receiving a command from the host system 1 (Step S11: NO), that the last communication error process set to the storage unit 6 has been carried out (Step S12: YES), it will stop the first timer 7 (Step S13) and terminate the main card-processing.

According to the second embodiment described above, in case that there is no reception of the first command from the host system 1 due to some problems after taking the card 4 to the inside 22 of the card processor 2, the card processor 2 autonomously determines whether or not the predetermined time T1 has elapsed without receiving the first command from the host system 1, and if it is determined that the predetermined time T1 has elapsed, then the communication error processes which are set assuming possible problems in advance are carried out to address, so the receiving damages may be suppressed to the minimum.

Specifically, for example, in the case where carrying out the transaction not ready informing process or the card return/re-take-in process is set as the communication error process, even if the card processor 2 has stopped receiving a first command from the host system 1 due to some problems, and the display contents of the display unit of the host system 1 conflict with the state of the card processor 2, the card processor 2 will return the card 4 existing in the inside 22 to the insertion/return area 23 if it is determined that the predetermined time T1 has elapsed without receiving the first command from the host system 1. This allows, immediately after the insertion of the card 4, the user to recognize that the transaction may not be made, so that the confusion with the above-described conflict may be prevented. Then accordingly, it is possible to prevent the occurrence of damages: that a user attempts to take out the card 4 from the inside 22 forcibly or attempts to insert other card to the inside 22 forcibly, thereby damaging the card processor 2 and card 4; and that a user handles the host system 1 violently, thereby damaging the same.

Moreover, because the card processor 2 monitors the reception of the command only after taking the card 4 to the inside 22 and until receiving a first command from the host system 1, the processing load of the control unit 5 after receiving the first command may be reduced. Moreover, while the host system 1, after taking in the card 4 and receiving the first command, is carrying out processes other than the process with respect to the card processor 2, it is unnecessary to carry out communication of commands, etc. between the host system 1 and the card processor 2, and therefore the processing load may be reduced by omitting wasteful communications between the host system 1 and the card processor 2. Moreover, when a first command is received from the host system 1 after taking in the card 4, the host system 1 recognizes that the card 4 has been taken to the inside 22, and displays on a display unit a screen other than the screen for prompting the user to insert the card 4, for example, "Now under processing. Please wait. If there is no response even after a while, please push a button for calling the clerk in charge." Therefore, even if the card processor 2 does not monitor the reception of a next command from the host system 1, the user will not insert other card to the inside 22 of the card processor 2 forcibly, and also damages of the card processor 2, card 4, or the like will not occur.

Moreover, because the preset communication error process is carried out corresponding to the elapsed time in the state of not receiving the first command from the host system, in the case where carrying out the transaction not ready process is set as the communication error process, it is possible to let the user to recognize the situation more clearly in which the transaction may not be made, and in the case where carrying out the no-command transmission informing process is set, it is possible to let the host system to recognize more in detail the situation in which the first command has not been received.

Next, a third embodiment of the present invention will be described with reference to FIG. 16. FIG. 16 is the flowchart showing the procedure of a main card-processing. The main card-processing of FIG. 16 is the process in the case where the reception of a command from the host system 1 is monitored regardless of whether or not the card 4 exists in the inside 22 of the card processor 2. Moreover, in the main card-processing of FIG. 16, the same numerals are given to the same units as those of the main card-processing of FIG. 5 described above. The difference between the main card-processing of FIG. 16 and that of FIG. 5 is that Step S2 of the main card-processing of FIG. 5 is omitted in the main card-processing of FIG. 16.

In FIG. 16, after activation of the card processor 2, the control unit 5 sets the predetermined times T1 and T2 (Step S1), zero-clears the first timer 7 (Step S3), and starts the first timer 7 in order to count the time until receiving a command from the host system 1 (Step S4). Then, the control unit 5 will carry out the processes of Steps S5 to S9, as described above. At that time, the processes carried out in accordance with the command received at Step S8 includes the card take-in process in which the card 4 inserted to the insertion/return area 23 is taken to the inside 22. Subsequently, if the counted time of the first timer 7 reaches the predetermined time T1 at Step S6 (Step S6: YES) without receiving a command from the host system 1 at Step S5 (Step S5: NO), the control unit 5 will carry out the communication error processes one by one in the sequence set to the storage unit (Step S10), as described above. Then, after completing carrying out one communication error process, the control unit 5 carries out Steps S11 and S12, as described above, and subsequently carries out Step S10 or Step S13, as described above, and terminates the main card-processing.

According to the third embodiment described above, in case that the transmission of the command from the host system 1 to the card processor 2 has stopped due to some problems regardless of whether or not the card 4 is already taken to the inside 22 of the card processor 2, the card processor 2 will autonomously determine whether or not the predetermined time T1 has elapsed without receiving a command from the host system 1, and if the card processor 2 determines that the predetermined time T1 has elapsed, then it will address by carrying out the communication error processes, which are set in advance assuming possible problems. So the receiving damages may be suppressed to the minimum.

Specifically, in the case where carrying out the transaction not ready process is set as the communication error process, even if problems, such as that the communication line between the host system 1 and the card processor 2 becomes in service interruption while the host system 1 displays on a display unit a screen for prompting the user to insert the card 4, or that the host system 1 or the card processor 2 becomes in no response or in runaway for some reasons, occurred and the card processor 2 has stopped receiving a command indicating to take in the card 4 from the host system 1, the card processor 2 will inform the user of the fact that transactions may not be made. It is therefore possible to let the user to recognize that the transaction may not be made, thereby preventing the confusion with the above-described conflict. Then accordingly, it is possible to prevent the occurrence of damages: that a user attempts to take out the card 4 from the inside 22 forcibly or attempts to insert other card to the inside 22 forcibly, thereby damaging the card processor 2 and card 4; and that a user handles the host system 1 violently, thereby damaging the same.

Moreover, in the case where the hardware reset process is set as the communication error process, even if transmission of a command from the host system 1 has stopped due to problems that the host system 1 or the card processor 2 becomes in no response or in runaway, it is possible to dissolve the above-described problems because the card processor 2 will reset to return to the initial state, and initializes a program for establishing a state where two way communication with the host system 1 is possible, a program for the main card-processing, and the like, and will carry out the same again from the beginning.

The present invention may employ various forms other than the above embodiments. For example, although in the above embodiments an example is taken in which the dedicated timer 7 for counting the time until receiving a command from the host system 1, and the dedicated timer 8 for counting the time until the card 4 is taken out are provided, respectively, the present invention is not limited only to this, and the time until receiving a command from the host system 1 and the time until the card 4 is taken out may be counted by a single timer, or may be counted by a plurality of timers, in turn.

Moreover, although the third embodiment shown in FIG. 16 is based on the main card-processing of FIG. 5 and is configured omitting Step S2, in which it is determined whether or not the card 4 during the main card-processing exists in the inside 22, the present invention is not limited only to this, and the third embodiment may be based on the main card-processing of FIG. 15 and be configured omitting Step S2 during the main card-processing.

Moreover, although in the embodiments described above, an example is taken in which the present invention is applied to the card processor 2 mounted on the Consumer Transaction Facility employed at financial institutions, such as a bank, the present invention may be applied also to card processors mounted on facilities other than the Consumer Transaction Facility.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A card processor receiving a card and carrying out a predetermined process, the card processor comprising:
    a take-in unit which takes the card to an inside of the card processor;
    a return unit which returns the card to a return area from the inside;
    a first detection unit which detects that the card exists in the inside;
    a second detection unit which detects that the card returned to the return area has been taken out;
    a communication unit to carry out communication with a host system mutually and to make a one-to-one physical connection to the host system with a cable, the host system being placed outside of the card processor;
    a first counting unit which, after receiving a command from the host system through the communication unit, responds to said command from the host system, and counts for at least a first time period from a time at which the response is made to said command and to a time at which a next command transmitted from the host system is received;

a second counting unit which counts for a second time period after the card is returned to the return area and until the card is taken out;

a communication error setting unit for setting a plurality of communication error processes which are executed when a time period counted by the first counting unit reaches the first time period before said next command is received from the host system, and for setting an execution sequence of the plurality of communication error processes; and a control unit which controls the take-in unit, the return unit, the communication unit, the first and second counting units and the communication error setting unit, based on detection results of the first and second detection units and the plurality of communication error processes of the communication error setting unit, wherein:

the control unit determines, based on the detection results of the first and second detection units, whether or not said card exists in the inside and whether or not the card exists in the return area, respectively, if the control unit judges that the card exists in the inside and only if the time period counted by the first counting unit has reached the first time period before said next command from the host system is received by the communication unit, then the control unit judges that a communication error has occurred and performs a process for the communication error in which the card is returned to the return area by the return unit, executes the plurality of communication error processes in accordance with the execution sequence set by the communication error setting unit, and determines whether or not the next command is received from the host system whenever each of the plurality of communication error processes is executed, if said next command has been received from the host system, then a process based on said next command is executed and an unexecuted communication error process of the plurality of communication errors is stopped from being executed, and the plurality of communication error processes include at least a process that if the control unit judges that the returned card exists in the return area and if the time counted by the second counting unit has reached the second time period while the card is not taken out from the return area, then the card is taken to the inside by the take-in unit.

2. The card processor according to claim 1, wherein the control unit judges that the communication error has occurred and then executes the plurality of communication error processes set by the communication error setting unit only if the time period counted by the first counting unit has reached the first time period before said next command is received from the host unit through the communication unit, the plurality of communication error processes including at least one of a process of informing the host system that the next command has not been transmitted, a process of standing by until the next command is transmitted from the host system, and a process of informing a user that transaction of the card has not been performed.

* * * * *